(12) United States Patent
Roch et al.

(10) Patent No.: US 6,553,320 B1
(45) Date of Patent: *Apr. 22, 2003

(54) METHOD FOR TESTING THE STABILITY OF VERTICALLY BRACED MASTS

(76) Inventors: Mathias Roch, Staunsfeld 13, D-23923, Herrnburg (DE); Oliver Roch, Hohenhorst-Nord 6, D-23623, Ahrensbök (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/341,491

(22) PCT Filed: Jan. 9, 1998

(86) PCT No.: PCT/DE98/00094
§ 371 (c)(1),
(2), (4) Date: Jul. 12, 1999

(87) PCT Pub. No.: WO98/31999
PCT Pub. Date: Jul. 23, 1998

(30) Foreign Application Priority Data

Jan. 16, 1997 (DE) .......................... 197 01 247

(51) Int. Cl.⁷ .................................. G01N 3/20
(52) U.S. Cl. .............................. 702/33; 702/41; 73/788; 73/851; 73/796
(58) Field of Search ................ 702/42, 43, 150, 702/33; 73/786, 788, 812, 844, 850, 851, 794, 796

(56) References Cited

U.S. PATENT DOCUMENTS

| | | | | | |
|---|---|---|---|---|---|
| 2,854,847 A | * | 10/1958 | Brady | ............... | 73/100 |
| 4,299,120 A | * | 11/1981 | Barker | ............... | 73/87 |
| 4,343,179 A | | 8/1982 | Astrom et al. | | |
| 4,350,044 A | | 9/1982 | Richardson et al. | | |
| 4,926,691 A | | 5/1990 | Franklin et al. | | |
| 5,056,370 A | * | 10/1991 | Maier | ............... | 73/794 |
| 5,212,654 A | * | 5/1993 | Deaur | ............... | 364/508 |
| 5,431,061 A | * | 7/1995 | Bertelsen et al. | ............... | 73/852 |
| 6,055,866 A | * | 5/2000 | Roch et al. | ............... | 73/796 |
| 6,314,376 B1 | * | 11/2001 | Roch et al. | ............... | 702/41 |

FOREIGN PATENT DOCUMENTS

| | | |
|---|---|---|
| DE | G 94 04 664.6 | 3/1994 |
| DE | 296 07 045 U1 | 11/1996 |
| EP | 0 068 794 A1 | 2/1995 |
| WO | PCT/DE96/02319 | 12/1996 |
| WO | PCT/DE97/00773 | 3/1997 |

OTHER PUBLICATIONS

U.S. patent application Ser. No. 09/125,430, Roch et al., filed Aug. 18, 1998.
U.S. patent application Ser. No. 09/180,703, Roch et al., filed Nov. 13, 1998.

* cited by examiner

Primary Examiner—Marc S. Hoff
Assistant Examiner—Paul Kim
(74) Attorney, Agent, or Firm—Jacox, Meckstroth & Jenkins (57) ABSTRACT

A method for testing the stability of vertically braced masts wherein the relevant mast is subjected to the load of a bending force starting from a defined initial value, and increasing to a maximum pre-set testing force above its bracing, the mast thereby being laterally displaced. The load is then removed from the mast and is subjected to a restoring force which reduces to zero. The mast is evaluated in conjunction with the load removal procedure to determine damage to the mast and/or its bracing. The mast is subjected to an additional bending force in the opposite direction of the first bending force, and the load is once again removed from the mast in a second test procedure. A possible remaining displacement of the mast/bracing system is evaluated in conjunction with the highest mast loads to determine the type of possible damage to the mast.

5 Claims, 5 Drawing Sheets

METHOD FOR TESTING THE STABILITY OF VERTICALLY BRACED MASTS

BACKGROUND OF THE INVENTION

The invention relates to a method for testing the stability of vertically anchored masts in which the mast above its anchoring is loaded with an increasing bending force proceeding from a defined initial value until at the most a maximum, predetermined test force and at the same time is laterally deflected and in which the mast after completion of the loading procedure is again unloaded and with this is subjected to a restoring force reducing to zero.

In EP0 638 794 A1 there is described a method for testing the solidity and bending resistance of a vertically anchored mast with which the mast likewise is subjected to a variable bending moment in that it is loaded with a force introduced above its anchoring and increasing in the course of the testing procedure, the measured value and the course of the force being used to determine the solidity of the mast. The mentioned force as well as also the distance about which the mast is laterally deflected at a selected location on account of the bending moment are measured simultaneously with sensors.

A linear dependency of the measured distance on the introduced force is evaluated as information of a mast deflection lying in the region of elastic deformation, whilst the determining of a non-linear dependency of the values measured by the sensors are evaluated as information of a plastic deformation and/or for a non-stable anchoring of the mast which is then recognized as not having bending resistance or is not stable and the testing procedure is stopped by unloading the mast. Thus with this method no safety precautions are to be made for the case that is not to be exected, specifically that the mast with this testing step may buckle or break. Moreover the testing procedure is only broken off by unloading the mast when a predetermined nominal value of the bending moment is achieved in the elastic region of deformation, which means that the mast is sufficiently stable and has bending resistance and does not need to be exchanged for another.

In accordance with one embodiment, the following results and information were achieved:

| RESULT: | INFORMATION: |
| --- | --- |
| A) S2 > 0, S4 > 0 loading characteristic curve course equal, whose end force values are approximately equal; | no tilting shifting, but a plastification of the mast in both testing procedures. |
| b) S2 > 0, S4 = 0; S2 = 0, S4 > 0 loading characteristic curve course unequal, essentially a straight lined reaching of FPmax in a testing procedure; | no tilting shifting but a fracture lengthened on testing. |
| c) S2 > 0, S4 > 0 loading characteristic curve course essentially equal, however, end force values in the second testing procedure higher; | no tilting shifting, but tension fracture corrosion or intercrystalline corrosion in the mast. |
| d) S2 = S4 as a whole an unequal loading characteristic curve course second loading characteristic curve beginning very flat and steeply rising at 54 until Fpmax; | only tilting shifting in first testing procedure. |
| e) S2 < S4 as a whole an unequal loading characteristic curve course, second loading characteristic curve beginning very flat and steeply rising at S4; | tilting shifting in the first testing procedure, fracture recognition with the second testing procedure. |
| f) S2 > S3 as a whole an unequal loading characteristic curve course, second loading characteristic curve beginning very flatly and at S3 increasing heavily, testing forces equal with both testing procedures; | tilting shifting and plastification of the mast with the first testing procedure. |

With this method it is not possible to determine whether the mast tested in each case, in spite of deformation lying in the elastic region until reaching the testing load, is damaged by a fracture or by a corrosion region possibly going through the mast, so that in the case of such damage one may possibly arrive at an erroneous evaluation of the remaining stability of the mast, since for example with the application of this method a linear course of the function $S=f(F)$, wherein F is the introduced force and S the lateral deflection of the mast, or a changing bending angle of the mast may give the delusion that the mast is not damaged.

This problem is solved by the method described in the Utility Model DE 296 07 045 U in which by way of a force unit the mast above its anchoring in the same plane of testing is loaded from the side, after one another with a compression force and with a tensile force, thus with oppositely directed bending moments so that for both cases of loading there results two functions $f_x$ and $f_y$ and these can be processed in an evaluation unit and compared. Furthermore these functions are usefully displayed on a monitor and/or graphically represented with a printer for the simultaneous assessment or subsequent evaluation.

These functions with an assumed straight course particularly give much information inasmuch as they give information whether there is damage caused for example by a fracture in the mast and where this damage is located.

If both functions $f_x$, $f_y$ have the same course and thus the same gradient, it may be concluded that in any case no damage of the mast in the vertical testing plane and in the mast region directly next to this plane will be present. If on the other hand the courses of the two functions $f_x$, $f_y$ related to the same zero point diverge and thus have differing gradients then a mast damage may be concluded even when the characteristic curves obtained from the two functions run linearly or straight, since a mast for example damaged with a fracture even after a further development of the fracture with an increasing loading of the mast will continue to behave elastically and a fracture formation at the most would result in a small kink in the otherwise continued linearly running characteristic curve.

As has already been mentioned, from the two functions obtained in the same testing plane and from their courses also the location of the damage may be concluded. If specifically e.g. the function $f_x$ evaluated with the compression procedure has a larger gradient than the function $f_y$ determined with the tensile procedure, this would mean that the fracture is located on the side of the mast on which the tensile force is indroduced, since it is to be expected that the mast on account of the smaller spreading of a transversly running fracture, without this at the same time having to become larger, will behave more elastically than with a compression force introduced in the opposite direction with which oppositely lying fracture surfaces are pressed together and the mast with this loading direction will behave less elastically as one without a fracture formation.

All previously dealt with methods have the common disadvantage that with them the condition that the mast or its anchoring with the respective loading cases may change its position in or on the ground may not be exactly taken into account. In any case it may happen that with the testing procedures it may for example arise that movements and a tilting shifting of the mast or its anchoring may occur on or in the ground and at the same time ground material is permanently displaced by the tilting of the mast or its anchoring, which of course would have an such effect on the course of the functions f that these would no longer give clear information on the stability of the mast as such.

BRIEF SUMMARY OF THE INVENTION

In particular this disadvantage is to be alleviated by the invention in that a method and a testing device are put forward with which in a relatively simple and above all secure manner a sound decision and answer to the question can be achieved as to whether on the one hand a tested mast is adequately stable and whether on the other hand the obtained measuring results may point to whether a shifting of the mast or its anchoring in the ground is present, wherein even on ascertaining such shifting, information is to be made possible whether the mast is damaged or not.

From one aspect, the invention relates to a method for testing the stability of vertically anchored masts in which the mast above its anchoring is loaded with an increasing bending force F1 proceeding from a defined initial value until at the most a maximum, predetermined test force FPmax and at the same time is laterally deflected and in which the mast after completion of the loading procedure is again unloaded and with this is subjected to a restoring Force F2 reducing to zero, wherein in combination with the unloading procedure exclusively a lateral defection S2 of the mast remaining at F2=zero is ascertained and is evaluated as damage to the mast and/or its anchoring.

From another aspect, the invention relates to a method for testing the stability of vertically anchored masts in which the mast above its anchoring in a first resting procedure is loaded with an increasing bending force F1 measured from a defined initial value until at the most a maximum predetermined test force FPmax and at the same time is laterally deflected and in which the mast after completion of the loading procedure is again unloaded and with this is subjected to a restoring force F2 reducing to zero, and in which the master after the first testing procedure in the same testing plane in a second testing procedure is loaded with a second test force F3 directed oppositely to the first test force F1 and with this is laterally deflected, whereupon the mast is again unloaded and with this is subjected to a reducing restoring force F4 reducing to zero, wherein in combination with the loading procedures at least the highest reached test force FP in each case or at least a part course of the loading characteristic curve at least of the second testing procedure is determined, wherein in combination with the unloading procedures exclusively a possible lateral deflection S2, S4 of the mast remaining at F2=0 and/or F4=0 is ascertained and wherein the results of both ascertainings are evaluated as damage to the mast and/or as a damage to its anchoring.

With the solution according to the method according to the invention in a surprising and very simple manner it is possible to acquire the condition of the system mast/anchoring and also the condition of the anchoring of the mast in the ground as well as of the mast even on testing, and specifically even then when with the testing of the system the maximum testing force has not been reached. It becomes evidently recognisable whether the anchoring and/or the mast has behaved solidly or stably. With respect to the anchoring it is thus recognisable whether the anchoring has resisted all forces acting on it and accordingly has not moved or whether on reaching the maximum testing force it has also given, thus has moved and as a rule has carried out a tilting movement. Indeed there are situations in practice where it is not neccesarily recognisable on the anchoring itself and/or on the ground surroundings of the anchoring whether a tilting movement and thus a tilting shifting of the anchoring has taken place during the testing procedure. Further it is recognisable whether with the tilting shifting of the mast and its anchoring, damage to the mast is present or not. Moreover it can also be recognized whether, with the anchoring which has remained solid, damage to the mast is present or not.

An essential reason for obtaining informative results on the testing of the system mast/anchoring in the simplest case of testing according to the invention lies exclusively in the drawing up and evaluation of the remaining lateral deflection, where appropriate present, of an unloading following a loading of the mast. If it is to be found that the restoring force reduced to zero after the complete unloading of the mast leads to a permanent residual deflection, then a damage to the mast and/or a tilting shifting of the mast anchoring is present.

The method according to the invention thus with respect to the methods known up to now in a very simple and quick manner permits an increased information capability of the tested system the mast and its anchoring.

For the further increase of the information cabability with respect to the damage to the mast and its anchoring, for each testing plane two testing forces acting in opposite directions are exerted on the mast in order to determine possible remaining residual deflections after the unloading. This means that for each testing plane, e.g. a compression loading in the one direction and a tensile loading in the opposite direction is applied. With this one obtains where appropriate two permanent residual deflections. Further as an alternative at least with the second testing procedure at least partly a loading characteristic curve is determined and drawn up, and specifically its course at the beginning and end. As a further alternative also the highest testing force values are measured and used for evaluation. From a comparison of these residual deflections with the part loading characteristic curve or with the highest testing force values there results even more exact information on the damage or lack of damage to the mast and/or its anchoring, in particular on the type of damage to the mast.

The information capability of the whole test may be even further increased in that a multitude of testing planes are used, in particular when with this for each plane one tests in opposite directions.

BRIEF DESCRIPTION OF THE DRAWINGS

The invention is hereinafter described in more detail with an embodiment example shown in the appended drawings. There are shown.

DETAILED DESCRIPTION OF THE INVENTION

Figure 1:
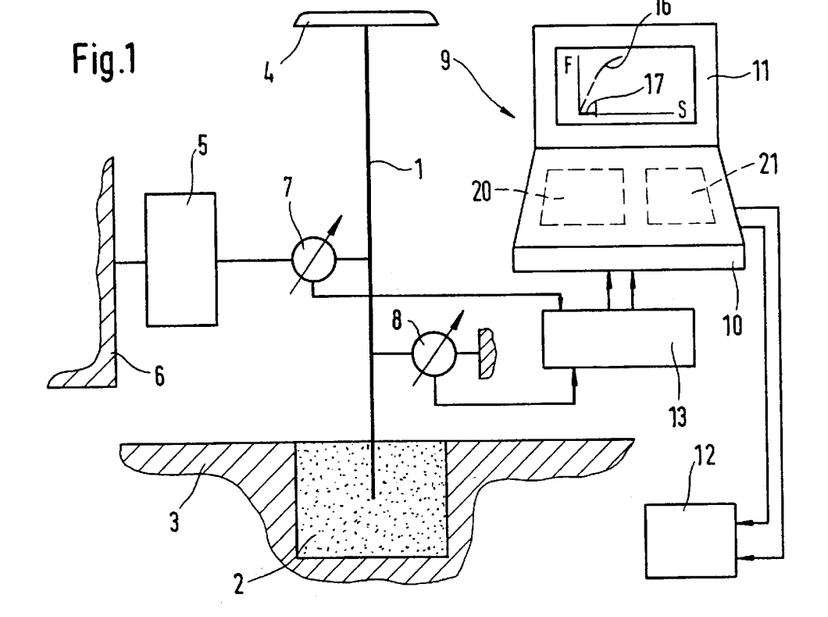
FIG. 1 a schematic and heavily simplified construction of a device in combination with a mast to be checked therewith and its anchoring, FIG. 2 testing procedures on a mast and its anchoring with the device according to FIG. 1, FIG. 3 the system of the mast and its anchoring in a perfect, and in a displaced condition, FIG. 4 the diagram of the testing procedure, in which the mast in a vertical plane is only loaded once and subsequently unloaded again, FIGS. 5 to 9 diagrams which show loading and unloading procedures with a mast including its anchoring, tested within a vertical plane plane in two opposite directions.
Figure 2:
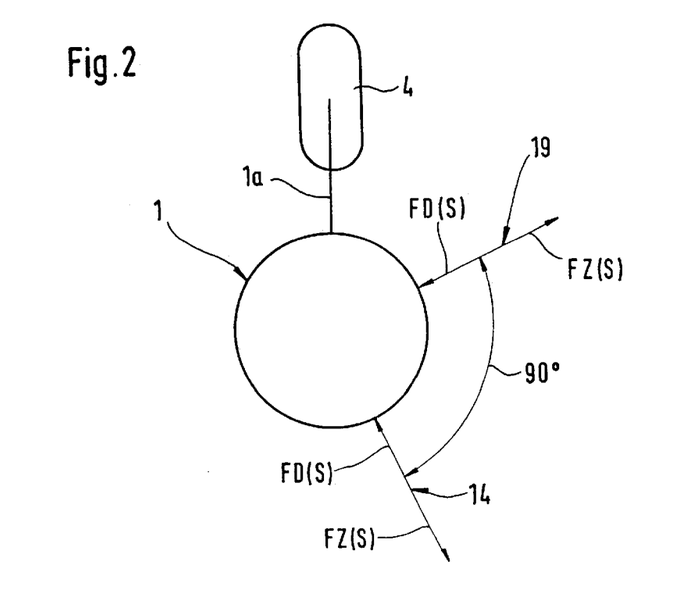
Figure 3:
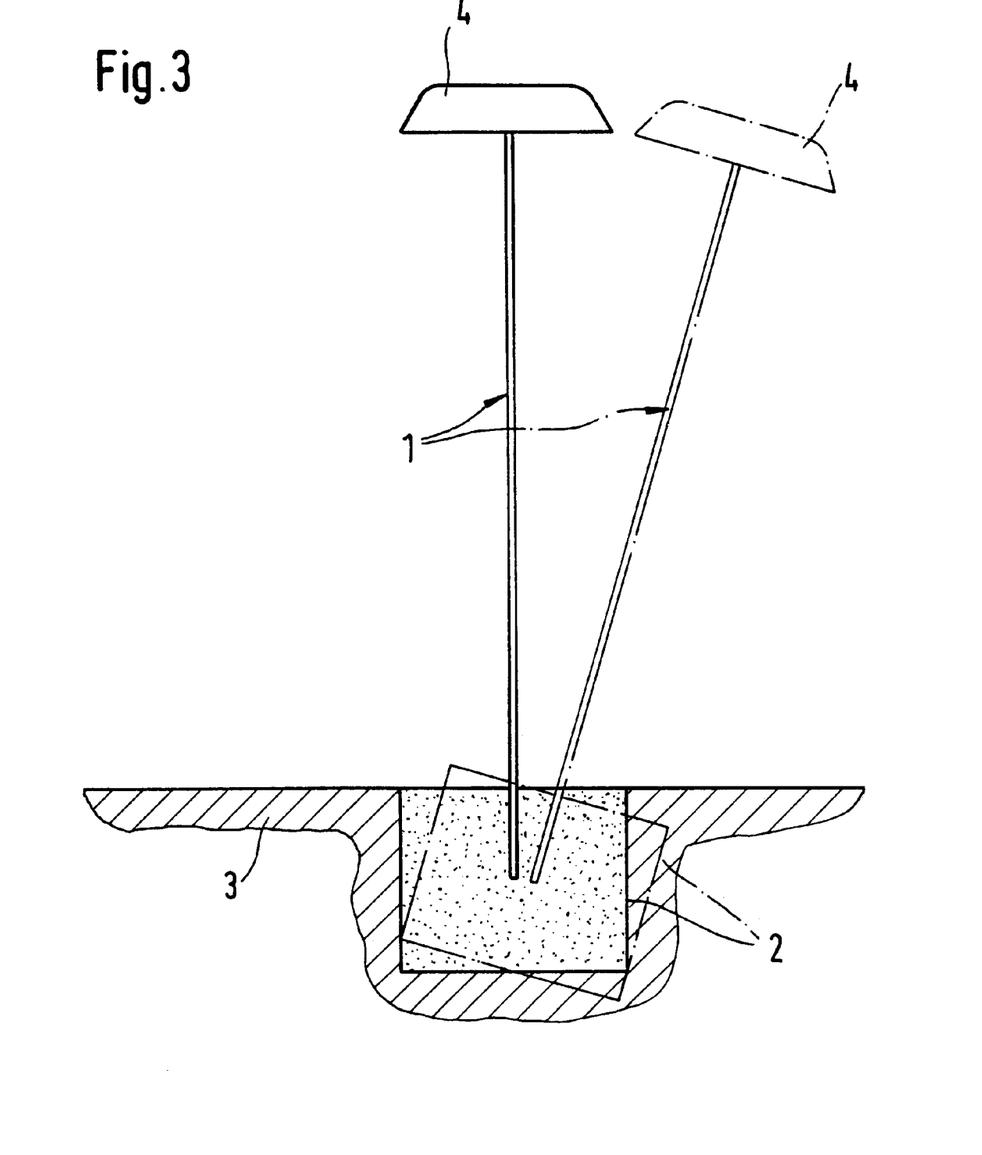

According to FIGS. 1–3 a mast 1 is fastened vertically in the ground 3 by way of an anchoring 2. The mast 1 is for example a light mast which where appropriate at its upper end comprises an arm 1a whose on end a street lamp 4 is mounted.

For the improved understanding of the invention first of all a device for testing the stability of the mast 1 including its anchoring 2 is described. It comprises a force unit 5 which for example is attachable on a mobile, schematically indicated vehicle 6, a force sensor 7 which is located between the force unit 5 and the mast 1, a distance sensor 8 preferably formed as a distance path sensor, which is arranged in the same vertical testing plane of the unit 5 and the force sensor 7, for example on the other side of the mast, as well as an evaluation unit 9 connected to the force sensor and the distance sensor. This evaluation unit comprises a computer 10, e.g. a personal computer which is connected to a monitor 11 and/or to a printer 12. Furthermore there is provided a transmitter 13 which leads the signals of the force sensor and of the distance sensor 8 in a processed form to the computer 10. The more exact construction, which is not further decisive, of the above mentioned device, may be designed as is described in DE-U-94 04 664.

The evaluation unit 9 is formed in a manner such that the compression force measuring results as well as the tensile force measuring results in the respective testing plane and in each case with respect to the associated mast deflection are displayed. The formation of the unit 9 thus comprises means 20 for determining loading characteristic curves and possible permanent residual deflections after unloading. For this correspondingly programmable computer components may be applied. The unit 9 may also contain further electrical processing circuits 21 in order to automatically evaluate the obtained curves or characteristic curves and residual deflections in a relationship to one another in the evaluation unit. The evaluated readings and computed values as well as damage determination may be optically (symbolically or alphabetically) displayed on the monitor and/or represented with the printer.

The testing of the mast and its anchoring for stability is carried out as follows.

First, a vertical testing plane is selected, in which the mast 1 is loaded by way of a force which engages the mast above the mast anchoring 2 at a predetermined location, i.e. is loaded with bending. Preferably such a plane is selected in which the main loading of the mast lies. At the same time preferably the loading of the mast by way of wind forces is taken into account. Such a vertical testing plane is indicated in FIG. 2 with reference numeral 14.

It is assumed that firstly a compression force reaching up to a predetermined, maximum test value is exerted continuously increasingly onto the mast. The distance sensor 8 which is connected onto the mast at a predetermined location above the anchoring 2 comprises with this example the lateral deflections S belonging to the corresponding pressure force FD. With this both values are simultaneously and continuously inputted to the transmitter 13 which in turn inputs them into the computer 10 suitably prepared. This computer processes the incoming readings, according to a program, i.e. it sets them into a relationship, and specifically as a function f of the force FD from which the associated mast deflection S is dependent. There thus arises a momentary loading characteristic curve 16 which is to be seen on the monitor 11. Alternatively, or additionally this characteristic curve 16 may also be printed with the printer 12 connected to the computer 10 and thereby documented. The evaluation of a complete loading characteristic curve is not absolutely necessary, also a part course is sufficient. Alternatively the evaluation of the highest force readings is sufficient.

After reaching the maximum testing force in the elastic deformation region of the mast the test force further acting as a compression force is reduced in a continuously falling manner until it has reached the value zero. With this a possible permanent residual deflection is indicated at 17 and is displayed on the monitor 11 and/or drawn with the printer 12. By way of a possible, any occuring residual deflection already an evaluation of the standing safety of the mast and its anchoring may be effected.

For the increased information ability on the stability or standing safety of the mast and/or its anchoring it is advantageous in the same vertical testing plane 14 to apply a second test force F in the opposite direction to the first test force. If the first test force is a compression force FD the second test force is preferably a tensile force FZ which is exerted in a continuously increasing manner and subsequently in falling manner, wherein with a reducing testing force any occuring permanent residual deflection S is measured and evaluated. At least with the second testing procedure a loading characteristic curve is at least partly evaluated and drawn up for evaluation.

For increasing even further the information capability on the stability of the mast 1 and its anchoring the mast may be tested in at least one further vertical testing plane 19 as explained previously, and specifically either in a single test procedure or in two oppositely directed test procedures. These further testing planes run preferably at right angles to the first testing plane 14.

The diagrams of the subsequently described FIGS. 4 to 9b represent the measuring and computing results as well as the determination of damage resulting from these, in only a single vertical testing plane. In the same sense they also apply to several selected vertical testing planes.

Figure 4:
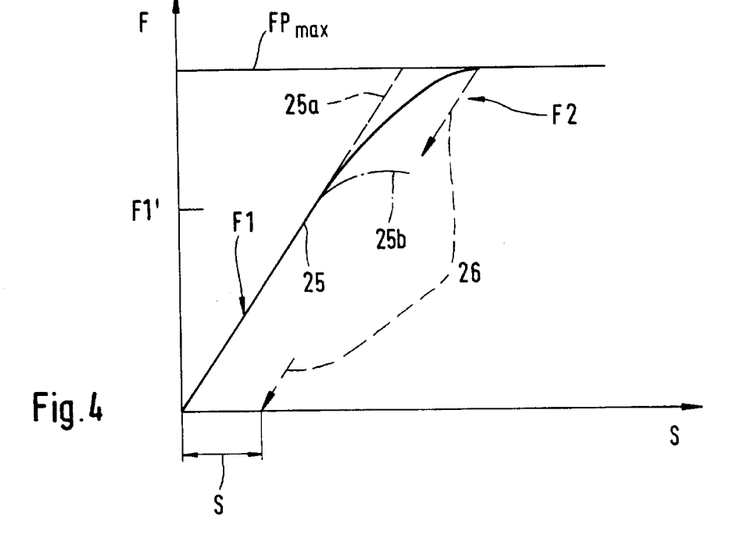

The diagram according to FIG. 4 relates to a single testing procedure. It is assumed that the mast 1 is subjected at a selected height above its anchoring 2 to a horizontally acting bending force F1 which via the mast also acts on its anchoring. The bending force is exerted onto the mast up to a predetermined maximum test force FP max, wherein the mast laterally deflects. For the respective momentary bending force there results an associated lateral deflection in particular of the mast, so that according to the function S=f(F) a course of force which loads the mast according to the unbroken line 25 in FIG. 4 is computed. This loading line 25 firstly increases uniformly and in its upper region, as is shown here, e.g. assumes a gradient which becomes flatter. With this the maximum test may be reached. Advantageously the loading line 25 is displayed on the monitor. After reaching the maximum test force the mast 1 by way of a reduction of the bending force is unloaded, wherein also the lateral deflection again becomes smaller. The unloading of the mast is indicated with arrow 26. With this the unloading force F2 which becomes smaller and the associated correspondingly reduced lateral deflection during the unloading are essentially not measured. However at the end of the unloading procedure it is measured whether with the mast unloading returned back to the force value zero there remains a lateral deflection as is indicated in FIG. 4 at S. On unloading the mast thus exclusively as an important criterion it is recorded and evaluated whether possibly a lateral deflection of the system of the mast and its anchoring has remained. In the present case according to FIG. 4 a permanent lateral deflection S has been ascertained. From this with the help of the automatic evaluation unit 9 it results that the mast and/or its anchoring is/are suffer damage. This result may also occur when the maximum test force is not reached and the testing procedure must be terminated before, as is indicated in a dot-dashed manner at 25b in FIG. 4.

If with the loading it results that the loading line does not change in its upper course, but continues to run in a straight manner, as is indicated dashed in FIG. 4 at 25a, then it results in the usual case that also with an unloading of the mast, a permanent lateral deflection cannot be ascertained. In this case no damage to the mast and/or its anchoring is given.

In FIG. 4 for example there is shown the loading characteristic curve 25 over its full length, thus beginning with a defined initial force with a value equal to zero. One may however also proceed in that only a part course of the loading characteristic curve 25 is evaluated, for example the upper half or an upper end course of the loading curve 25. In this case the evaluation of the loading characteristic curve 25 begins e.g. defined at the force F1' and the associated lateral mast deflection for this. Such a manner of proceeding may also be applied to all subsequently described embodiment examples.

If with the determining of damage according to the previously described example it is desired to know whether the damage concerns only the mast or only its anchoring or both, then in the same vertical testing plane there is carried out a further testing procedure in which the second bending force is directed oppositely to the preceeding bending force. If the first bending force was a compression force then the second bending force will be a tensile force, in order to prevent a repositioning of the device used for the testing. Such a device is shown in FIGS. 5 to 9.

Figure 5A:
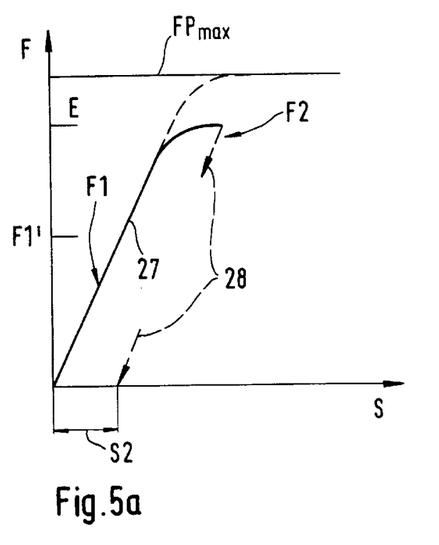

According to FIG. 5a the mast to be tested in a first testing procedure is for example loaded with a continuously increasing bending force F1 so that in combination with the associated mast deflection S, according to the first function S=f(F1) there results a loading characteristic curve 27. One recognises that the sought after maximum test force FPmax is not reached, but that the curve 25 previously in its gradient becomes flatter and flatter and at its upper end section blends into an arcuate shape. This first testing procedure is terminated at this location and on account of the still present elasticity of the mast there is effected a springing back of the system mast/anchoring. The unloading of the mentioned system is effected by the reduction of the first bending force as now being a decreasing bending force F2 to the value zero according to the arrow 28, wherein exclusively a possible remaining residual deflection of the system is measured and evaluated. One recognises in the present case that after the bending force F2 returned back to zero there is given a permanent residual deflection S2 which is given in numbers on the monitor or is symbolically read off and/or documented with the printer.

Figure 5B:
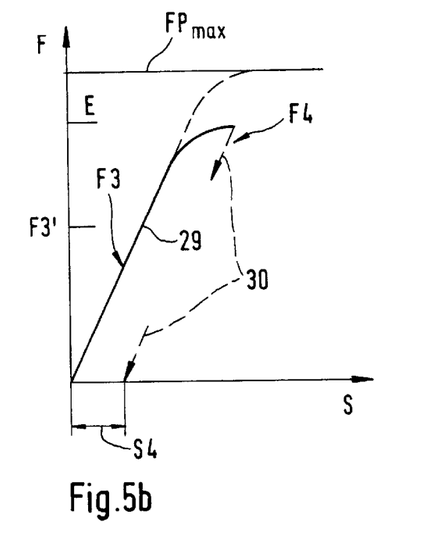

According to FIG. 5b in the same vertical testing plane there is carried out second testing procedure, and specifically in the same manner as was described in combination with FIG. 5a. The second increasing bending force F3 leads to a loading characteristic curve 29, wherein this curve before reaching the maximum test force FPmax again blends into an upper section with a curvature becoming flatter. The subsequent unloading (decreasing bending force F4) is indicated with arrow 30, wherein again after completion of the unloading one merely takes account of the remaining lateral deflection. In the present case there resulted with the unloading a permanent residual deflection S4 of the system which is measure and evaluated.

With this complete checking with both testing procedures the maximum test force FPmax was not reached, as is indicated at E in the Figures. However there may also be cases where the maximum test force is reached. This is indicated dashed in the FIGS. 5a and 5b. Furthermore as already indicated previously, with this whole testing procedure it may likewise be proceeded such that the loading characteristic curves 27 and 29 are only evaluated and drawn up when only their upper course is to be kept. In this case the computation of the desired course of curve only begins when the test bending forces have reached the value F1' and F3'.

A comparison of the two diagrams according to the FIGS. 5a and 5b shows that the loading characteristic curves 27 and 29 in their upper end section curve becoming flatter, and specifically with the same or roughly the same end value E of the test force applied in each case. Furthermore it is evident that in both cases the same or roughly the same residual deflections S2 and S4 were ascertained, which are both larger than zero. The damage result of the two testing procedures determined in the evaluation unit 9c lies in that a tilting shifting of the mast anchoring is not present but that there is damage to the mast itself. The mast has been damaged by a corrosion procedure which in the two testing procedures has shown itself in that on testing a plastification of the mast in the region of the corrosion location has taken place. Essential features for this are that the mast damage with the two testing procedues with the same or roughly the same momentary test force are recognizable in combination with a permanent residual deflection.

Figure 6A:
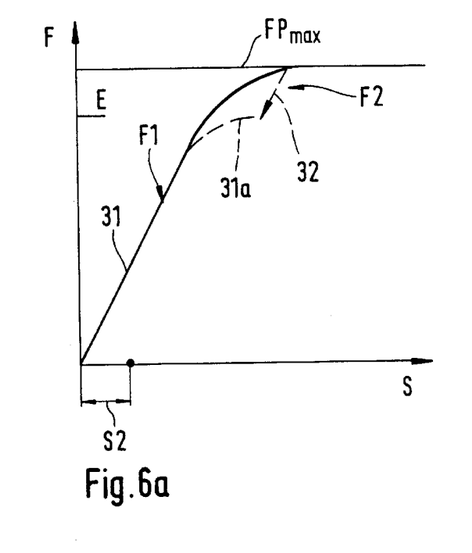
Figure 6B:
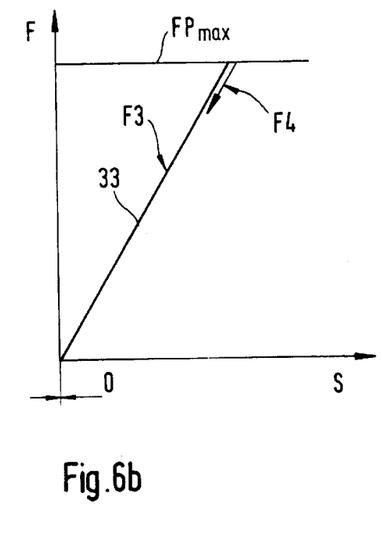

The two testing procedures in the FIGS. 6a and 6b disclose a different type of damage to the tested mast. Also in this case the two testing procedures were in each case carried out with a bending force as previously explained. In the first testing procedure a loading characteristic curve 31 was obtained, which in its upper end section has a curvature becoming flatter and finally reaches the maximum test force FPmax. It may however also end at E below the maximum test force, wherein the corresponding curvature is indicated at 31a. The unloading of the mast according to the arrow 32 effected after the loading resulted in a permanent residual deflection.

With the second testing procedure according to FIG. 6b there resulted a different picture of the course of testing. There fistly resulted a loading characteristic curve 33 which however as a whole runs straight and with which the maximum test force FPmax has been reached. The subsequent unloading of the mast resulted in no permanent residual deflection as is indicated in FIG. 6b with the numeral 0. Although with the second testing procedure no type of damage could be discovered, thus neither to the mast itself or to the anchoring, however from FIG. 6a without doubt it is concluded that there is damage to the mast. The permanent residual deflection S2 determined in the first testing procedure indicates a fracture in the mast, which with the first testing procedure has enlarged such that a permanent residual deflection could be ascertained. The fracture damage to the mast may be explained by FIG. 6b since here the testing has taken place in the opposite direction and with this the fracture halves were pressed onto one another so that the mast with the second testing procedure has practically behaved like an undamaged mast. With the whole testing according to FIG. 6 thus likewise no shifting of the mast anchoring has been ascertained.

Figure 7A:
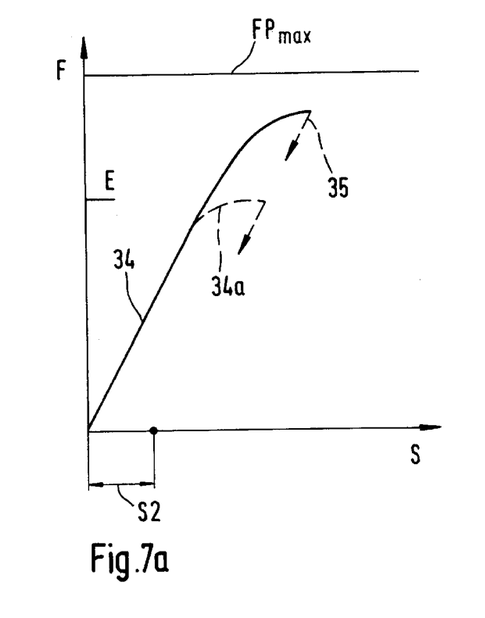
Figure 7B:
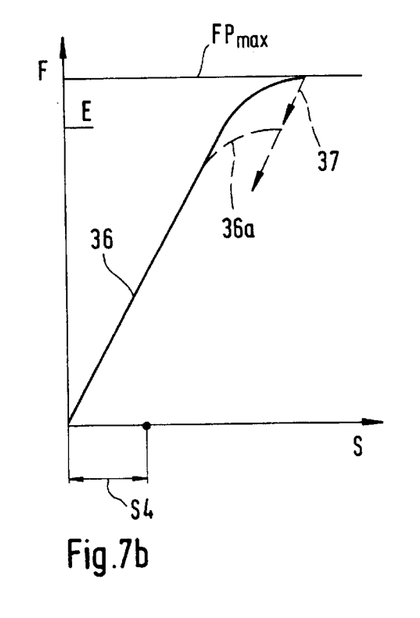

Yet a further type of damage can be deduced from the FIGS. 7a and 7b. With the first testing procedure according to FIG. 7a (compression force) there firstly resulted a loading characteristic curve 34 according to the first function S=f (F1). At its upper end region again this line blends into a curvature becoming flatter, and specifically at a momentary test force which lies below the maximum test force. The testing procedure was terminated, and after the completed unloading of the mast according to the arrow 35, that is with the test force returned back to zero, a permanent residual deflection S2 was ascertained. The second testing procedure in the same testing plane with an opposite test force (tensile force) resulted in a loading characteristic curve 36 according to the third function S=f(F3) which at its upper region on reaching the maximum test force blends into a curvature becoming flatter. The subsequent unloading according to arrow 37 resulted in a permanent residual deflection S4. In both cases the respective loading characteristic curve may also end at a correspondingly lower value E which is indicated in each case at 34a and 36a.

A comparison of the diagrams according to the FIGS. 7a and 7b results in that the courses of the loading characteristic curves 34; 36 at their upper region as such are equal or are essentially equal, but that in the second testing procedure a larger momentary test force was reached. Furthermore in each case permanent residual deflections S2 and S4 were ascertained. These results indicate a tension fracture corrosion or an intercrystalline corrosion of the mast. In the region of the fracture which with the first testing procedure has widened somewhat, during the operation of the mast a corrosion has taken place, which on testing the mast is the cause for its plastification in the region of the corrosion so that with this second testing procedure a higher test force had to be applied. The two remaining residual deflections S2 and S4 are equal or roughly equal so that a shifting of the mast anchoring with these two testing procedures can be ruled out.

Figure 8A:
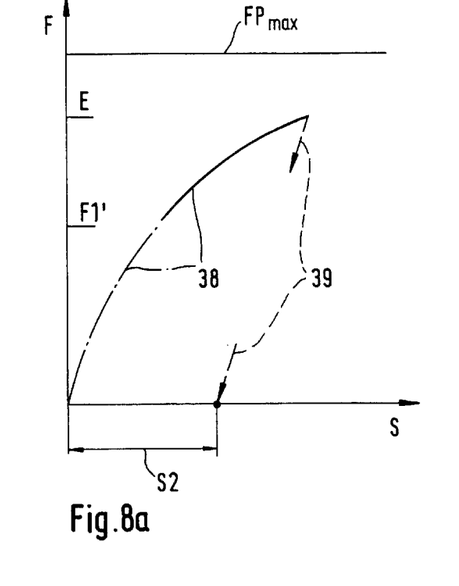
Figure 8B:
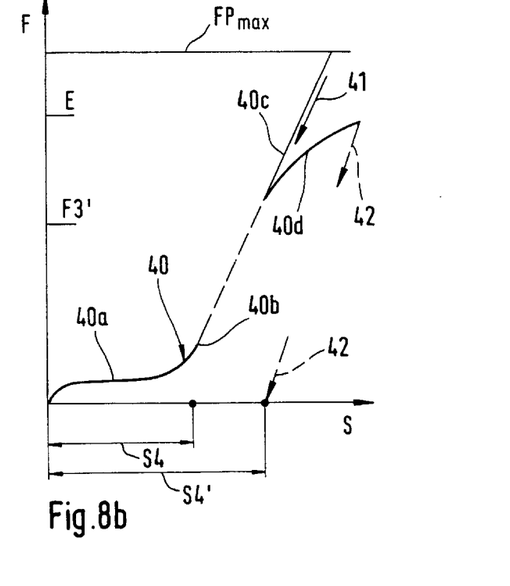

A further test result is shown in the FIGS. 8a and 8b. According to FIG. 8a there resulted a loading characteristic curve 38 according to the first function S=f (F1). This line has for example an arcuate course from the very beginning, and the testing procedure (compression force) was terminated below the maximum test force FPmax at E. The subsequent unloading of the mast 1 and its anchoring 2, effected according to the arrow 39, but not drawn up, leads to a remaining and measured residual deflection S2. The subsequent second testing procedure in the same testing plane, but in the opposite direction (tensile force) resulted in a loading characteristic curve 40 which in its lower course 40 a firstly increases gradually and then sets into a constant value, wherein a deflection of the system mast/anchoring is to be ascertained over a certain stretch S. Thereafter there is effected a relatively steep increase in the loading characteristic curve, wherein the maximum test force FPmax can be reached, as is indicated at 40c. The upper course of the line 40 may however at E before reaching the maximum test force blend into a curvature which is indicated at 40d. The respective unloading, thus reduction in test force until the value zero, according to the arrows 41 and 42 leads to permanent residual deflections S4 and S4' respectively.

On account of the measuring and computation results according to the diagram according to FIG. 8a it is recommended with the second testing procedure to evaluate and draw up at least a part course of the loading characteristic curve 40 in order to be able to better evaluate the remaining residual deflections with the respective unloading. As FIG. 8b shows also the lower part course 40a of the loading characteristic curve 40 may be an important criterion. Alternatively or additionally however also the upper part course 40d of the line 40 may represent a criterion. The middle part course shown in dashed lines of the loading characteristic curve 40 as well as of also all other loading characteristic curves is relatively unimportant so that its evaluation may be omitted. Whilst with the first testing procedure one may omit the evaluation and drawing up of the loading characteristic curve 38, wherein however the value of the highest reached test force is to be taken account of and where appropriate kept, it is important that at least in the second testing procedure at least a part course of the loading characteristic curve 40 is to be drawn up and evaluated.

In a first variant of the test according to FIG. 8 it results that the ascertained and measured residual deflection S4 is equal to or is essentially equal to the residual deflection S2, wherein the loading characteristic curve 40 after an initially flat course 40a blends into a steep and roughly unchanging course until the maximum test force. This means that the mast itself does not have any damage, but that there is present a shifting of the mast anchoring.

With the second variant of the testing procedure according to FIG. 8, in which the highest value E of the reached test force in the second testing procedure corresponds to or roughly corresponds to the highest value E of the test force in the first testing procedure, and in which a larger residual deflection S4' has been ascertained, it results that not only a shifting of the mast anchoring is present, but that also the mast itself has damage in the form e.g. of a fracture.

Figure 9A:
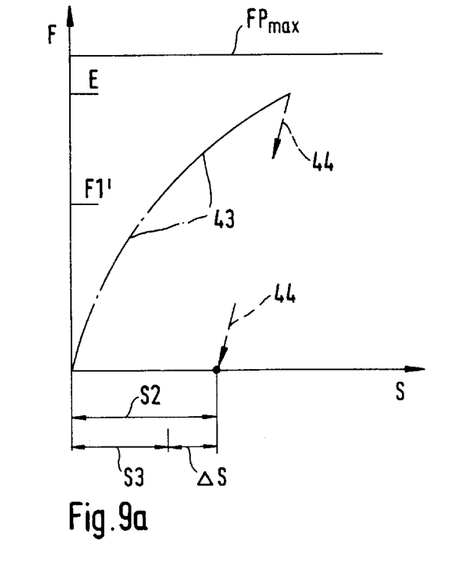
Figure 9B:
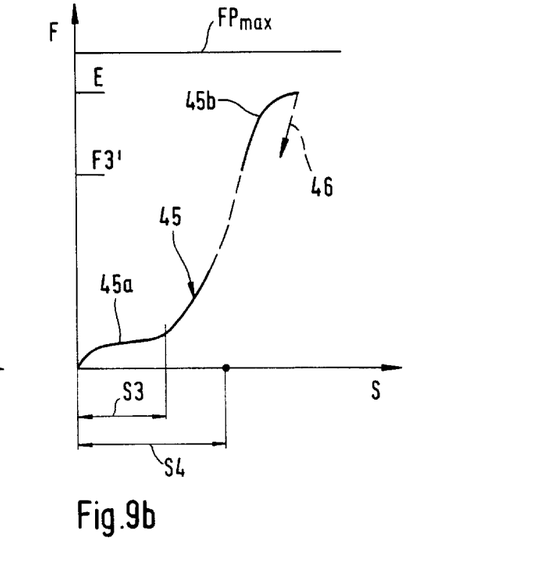

The FIGS. 9a and 9b show a further variant which is similar to the last mentioned of the FIGS. 8a and 8b. After the loading characteristic curve 43 according to FIG. 9a has advantageously been evaluated and drawn up in its upper part course or alternatively the highest value of the reached test force E has been retained, there is only effected an unloading of the system mast/anchoring until the value zero as shown by the arrow 44. At this unloading a permanent residual deflection S2 was ascertained. According to FIG. 9b there resulted in the second testing procedure a loading characteristic curve 45 which initially at 45a runs flat and then blends into a steeper course and finally has an arcuate end course 45b becoming flatter and reaching test force E. It is shown that the lower part course of the line 45 only runs relatively flat in the initial region 45a, and specifically over a deflection path S3, and then becomes considerably steeper. After the completed unloading of the mentioned system according to the arrow 46, thus with the restoring force with the value equal to zero, there results a permanent residual deflection S4. The highest reached test force E according to FIG. 9b corresponds in its value to the value of the test force in the first testing procedure according to FIG. 9 or is roughly equal to this.

The test result according to FIG. 9 lies in the fact that a shifting of the mast anchoring and a damage to the mast is present. The tilting shifting of the mast anchoring is already clear from the fact that the residual deflection S3 is smaller than the residual deflection S2. S2 is thus composed together from S3 which indicated a mast shifting, and of ΔS, which indicates a damage to the mast itself. The sum of S3 and ΔS may with this correspond to the remaining residual deflection S4.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method for testing the stability of vertically anchored masts in which the mast above its anchoring is loaded with an increasing bending force F1 proceeding from a defined initial value until a maximum, predetermined test force FPmax and at the same time is laterally deflected and in which the mast after completion of the loading procedure is unloaded and with this is subjected to a restoring force F2 reducing to zero, wherein in combination with the unloading procedure exclusively a lateral deflection S2 of the mast remaining at F2=zero is ascertained and is evaluated as damage to the mast and/or its anchoring;

wherein said lateral deflection S2 is obtained exclusively when said mast is unloaded.

2. A method for testing the stability of vertically anchored masts in which the mast above its anchoring in a first testing procedure is loaded with an increasing bending force F1 measured from a defined initial value until a maximum predetermined test force FPmax at the same time is laterally deflected and in which the mast after completion of the loading procedure is unloaded and with this is subjected to a restoring force F2 reducing to zero, and in which the mast after the first testing procedure in the same testing plane in a second testing procedure is loaded with a second test force F3 directed oppositely to the first test force F1 and with this is laterally deflected, whereupon the mast is again unloaded and with this is subjected to a reducing restoring force F4 reducing to zero, wherein in combination with the loading procedures at least one of the highest test force FP or at least a part course of the loading characteristic curve of the second testing procedure is determined, wherein in combination with the unloading procedures exclusively a possible lateral deflection S2, S4 of the mast remaining at F2=0 and/or F4=0 is ascertained and wherein the results of both ascertainings are evaluated as damage to the mast and/or as a damage to its anchoring.

3. A method according to claim 2, wherein as a part course of the respective loading characteristic curve its upper end course and/or its lower initial course is determined and evaluated for ascertaining damage.

4. A method according to claim 2, wherein the following results are evaluated as the following conclusions, wherein "tilting shifting" means a position change of the mast or its anchoring on or in the ground:

| RESULT: | INFORMATION: |
|---|---|
| A) S2 > 0, S4 > 0 loading characteristic curve course equal, whose end force values are approximately equal; | no tilting shifting, but a plastification of the mast in both testing procedures. |
| b) S2 > 0, S4 = 0; S2 = 0, S4 > 0 loading characteristic curve course unequal, essentially a straight lined reaching of FPmax in a testing procedure; | no tilting shifting but a fracture lengthened on testing. |
| c) S2 > 0, S4 > 0 loading characteristic curve course essentially equal, however, end force values in the second testing procedure higher; | no tilting shifting, but tension fracture corrosion or intercrystalline corrosion in the mast. |
| d) S2 = S4 as a whole an unequal loading characteristic curve course second loading characteristic curve beginning very flat and steeply rising at S4 until Fpmax; | only tilting shifting in first testing procedure. |
| e) S2 < S4 as a whole an unequal loading characteristic curve course, second loading characteristic curve beginning very flat and steeply rising at S4; | tilting shifting in the first testing procedure, fracture recognition with the second testing procedure. |
| f) S2 > S3 as a whole an unequal loading characteristic curve course, second loading characteristic curve beginning very flatly and at S3 increasing heavily, testing forces equal with both testing procedures; | tilting shifting and plastification of the mast with the first testing procedure. |

5. A method according to claim 3, wherein the following results are evaluated as the following conclusions, wherein "tilting shifting" means a position change of the mast or its anchoring on or in the ground:

| RESULT: | INFORMATION: |
|---|---|
| A) S2 > 0, S4 > 0 loading characteristic curve course equal, whose end force values are approximately equal | no tilting shifting, but a plastification of the mast in both testing procedures |
| b) S2 > 0, S4 = 0; S2 = 0, S4 > 0 loading characteristic curve course unequal, essentially a straight lined reaching of FPmax in a testing procedure | no tilting shifting but a fracture lengthened on testing |
| c) S2 > 0, S4 > 0 loading characteristic curve course essentially equal, however, end force values in the second testing procedure higher | no tilting shifting, but tension fracture corrosion or intercrystalline corrosion in the mast |
| d) S2 = S4 as a whole an unequal loading characteristic curve course, second loading characteristic curve beginning very flat and steeply rising at S4 until FPmax | only tilting shifting in first testing procedure |
| e) S2 < S4 as a whole an unequal loading in the characteristic curve course, second loading characteristic curve beginning very flat and steeply rising at S4 | tilting shifting in the first testing procedure, fracture recognition with the second testing procedure |
| f) S2 > S3 as a whole an unequal loading characteristic curve course, second loading characteristic curve beginning very flatly and at S3 increasing heavily, testing forces equal with both testing procedures | tilting shifting and plastification of the mast with the first testing procedure |

* * * * *